US012806524B2

(12) United States Patent
Wu et al.

(10) Patent No.: US 12,806,524 B2
(45) Date of Patent: Nov. 24, 2026

(54) ANIMATION DATA PROCESSING METHOD, NON-TRANSITORY STORAGE MEDIUM AND ELECTRONIC DEVICE

(71) Applicant: NETEASE (HANGZHOU) NETWORK CO., LTD., Hangzhou (CN)

(72) Inventors: Xueping Wu, Hangzhou (CN); Zihao Tang, Hangzhou (CN); Zijing Guan, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 172 days.

(21) Appl. No.: 18/571,780

(22) PCT Filed: Apr. 7, 2022

(86) PCT No.: PCT/CN2022/085465

§ 371 (c)(1),
(2) Date: Dec. 19, 2023

(87) PCT Pub. No.: WO2023/015921

PCT Pub. Date: Feb. 16, 2023

(65) Prior Publication Data

US 2024/0307779 A1 Sep. 19, 2024

(30) Foreign Application Priority Data

Aug. 11, 2021 (CN) ......................... 202110920138.3

(51) Int. Cl.

| | |
|---|---|
| ***A63F 13/56*** | (2014.01) |
| ***A63F 13/355*** | (2014.01) |
| ***G06T 13/00*** | (2011.01) |

(52) U.S. Cl.
CPC .............. *A63F 13/56* (2014.09); *G06T 13/00* (2013.01); *A63F 13/355* (2014.09); *A63F 2300/6607* (2013.01)

(58) Field of Classification Search
CPC ...... A63F 13/56; A63F 13/355; A63F 13/822; A63F 2300/807; G06T 13/00; G06T 13/40; G06N 3/04; G06N 20/00
See application file for complete search history.

(56) References Cited

U.S. PATENT DOCUMENTS 7,859,538 B2 * 12/2010 Isner ........................ G06T 13/40
345/473
10,546,408 B2 * 1/2020 Yang ...................... G06N 3/044
(Continued)

FOREIGN PATENT DOCUMENTS

CN 102708582 A 10/2012
CN 106485773 A 3/2017
(Continued)

OTHER PUBLICATIONS

PCT/CN2022/085465, international preliminary report on patentability, downloaded from wipo.int, Sept. 20, 2025.*
(Continued)

*Primary Examiner* — Kang Hu
*Assistant Examiner* — Matthew D Hoel
(74) *Attorney, Agent, or Firm* — Qinghong Xu

(57) ABSTRACT

The present disclosure discloses an animation data processing method, a non-transitory storage medium and an electronic device. The method includes: acquiring target motion description information of a target virtual character model, wherein the target motion description information records position information of a key node skeleton of a character skeleton of the target virtual character model in each character animation frame, the character skeleton framework
(Continued)

includes a complete skeleton of the target virtual character model, and the key node skeleton is a partial skeleton in the complete skeleton of the character skeleton; inputting the target motion description information into a target neural network model corresponding to the target virtual character model so as to obtain target animation data of the target virtual character model; and driving, according to the target animation data, the target virtual character model to execute a corresponding action.

20 Claims, 6 Drawing Sheets

(56) References Cited

U.S. PATENT DOCUMENTS

| | | | | |
|---|---|---|---|---|
| 10,902,343 | B2 * | 1/2021 | Andrews | G06N 20/00 |
| 11,257,586 | B2 * | 2/2022 | Karanam | G06V 20/64 |
| 11,830,121 | B1 * | 11/2023 | Starke | A63F 13/573 |
| 11,951,384 | B2 * | 4/2024 | Miller | G06V 40/107 |
| 2008/0024487 | A1 * | 1/2008 | Isner | G06T 13/40<br>345/473 |
| 2018/0096259 | A1 * | 4/2018 | Andrews | G06N 20/00 |
| 2019/0295305 | A1 * | 9/2019 | Yang | G06N 3/044 |
| 2019/0303658 | A1 * | 10/2019 | Ando | G06N 3/08 |
| 2019/0362529 | A1 * | 11/2019 | Wedig | G06T 13/40 |
| 2021/0158107 | A1 * | 5/2021 | Karanam | G16H 30/20 |
| 2022/0134218 | A1 * | 5/2022 | Miller | G06N 3/08<br>463/36 |
| 2023/0123820 | A1 * | 4/2023 | Wang | G06N 3/088<br>345/474 |

FOREIGN PATENT DOCUMENTS

| | | | | | |
|---|---|---|---|---|---|
| CN | 106780681 | A | | 5/2017 | |
| CN | 111161427 | A | | 5/2020 | |
| CN | 112037310 | A | | 12/2020 | |
| CN | 113706666 | A | | 11/2021 | |
| EP | 3683772 | A1 | * | 7/2020 | G06T 13/80 |
| WO | WO-2019243899 | A1 | * | 12/2019 | A63F 13/573 |
| WO | WO-2020236596 | A1 | * | 11/2020 | G06N 3/047 |
| WO | WO-2021143289 | A1 | * | 7/2021 | G06N 3/045 |

OTHER PUBLICATIONS

PCT/CN2022/085465, written opinion, downloaded from wipo.int, Sept. 20, 2025.*

PCT/CN2022/085465, international search report, downloaded from wipo.int, Sept. 20, 2025.*

Machine translation of CN 106485773 A, downloaded from espacenet.com, Sept. 20, 2025.*

“MotioNet: 3D Human Motion Reconstruction from Monocular Video with Skeleton Consistency,” Shi, et al., published 2020, downloaded from arxiv.org, Jun. 16, 2026.*

“Hierarchical Neural Implicit Pose Network for Animation and Motion Retargeting,” Biswas, et al., published 2021, downloaed from arxiv.org, Jun. 16, 2026.*

“Skeleton-Aware NetworksforDeepMotion Retargeting,” Aberman, et al., published 2020, downloaded from deepmotionediting.github.io, Jun. 16, 2026.*

“SparsePoser: Real-time Full-body Motion Reconstruction from Sparse Data,” Ponton, et al., published 2023, downloaded from upcommons.upc.edu, Jun. 16, 2026.*

Machine translation of WO 2021/143289 A1, downloaded from PE2E-Search, Jun. 16, 2026, copyright 2026 Clarivate Analytics. (Year: 2021).*

International Search Report dated Jun. 16, 2022 of International Application No. PCT/CN2022/085465.

1st Office Action dated Jan. 28, 2023 of Chinese Application No. 202110920138.3.

Zhou Yang, “Research on Motion Retargeting Method for Motion Data Represented by Joint Position,”Chinese Master’s Theses Full-text Database, Information Science and Technology), No. 02, Feb. 15, 2021 (Feb. 15, 2021)., pp. 15-49.

* cited by examiner

ANIMATION DATA PROCESSING METHOD, NON-TRANSITORY STORAGE MEDIUM AND ELECTRONIC DEVICE

CROSS REFERENCES TO RELATED APPLICATIONS

The present disclosure is a U.S. National Stage Application of International Application No. PCT/CN2022/085465, filed on Apr. 7, 2022, which is based upon and claims priority to Chinese Patent Application No. 202110920138.3, titled with "METHOD FOR PROCESSING ANIMATION DATA, NON-VOLATILE STORAGE MEDIUM AND ELECTRONIC DEVICE" and filed on Aug. 11, 2021, the entire contents of both of which are incorporated herein by reference for all purposes.

TECHNICAL FIELD

The present disclosure relates to the field of computer, and in particular, to a method for processing animation data, a non-transitory storage medium and an electronic device.

BACKGROUND

At present, skeletal animation used in game scenes provided in the related arts typically has the following features.

(1) There are a large number of game character animations, whether respective virtual character model perform the same action or different actions, it is necessary to store, for each virtual character model, corresponding skeletal animation data for describing all skeletal position information.

(2) When the virtual character model performs motion transition, the fusion of postures presented by a multi-frame character animation will exist on a skeleton framework of the virtual character model.

It should be noted that the information disclosed in the background section above is only used to enhance the understanding of the background of the present disclosure, and therefore may include information that does not constitute the prior art known to those skilled in the art.

SUMMARY

Embodiments of the present disclosure provide a method for processing animation data, a non-transitory storage medium, and an electronic device.

According to an embodiment of the present disclosure, there is provided a method for processing animation data, including:

acquiring target motion description information of a target virtual character model, where the target motion description information is configured to record position information of a key node skeleton of a character skeleton framework of the target virtual character model in each frame of character animation, the character skeleton framework includes a complete skeleton of the target virtual character model, and the key node skeleton is a partial skeleton in the complete skeleton of the character skeleton framework; inputting the target motion description information to a target neural network model corresponding to the target virtual character model to obtain target animation data of the target virtual character model, where the target neural network model is a model obtained by performing machine learning training with skeletal animation training data corresponding to the target virtual character model, the target animation data includes a multi-frame target character animation, and position information of the complete skeleton of the character skeleton framework of the target virtual character model in a current posture is recorded in each frame of character animation of the multi-frame target character animation; and driving the target virtual character model according to the target animation data to perform a corresponding action.

According to an embodiment of the present disclosure, there is further provided a non-transitory storage medium having a computer program stored thereon, wherein the computer program is configured to execute the method for processing the animation data in any one of embodiments as described above when running.

According to an embodiment of the present disclosure, there is further provided an electronic device, including a memory and a processor, wherein a computer program is stored in the memory, and the processor is configured to run the computer program to execute the method for processing the animation data in any one of embodiments as described above.

It should be understood that the above general description and the following detailed description are merely exemplary and explanatory, and should not limit the present disclosure.

BRIEF DESCRIPTION OF THE DRAWINGS

The drawings described here are used to provide a further understanding of the present disclosure, and constitute a part of the present disclosure. Example embodiments of the present disclosure and their descriptions are used to explain the present disclosure, and do not constitute improper limitations to the present disclosure. In the drawings.

DETAILED DESCRIPTION

Figure 1:
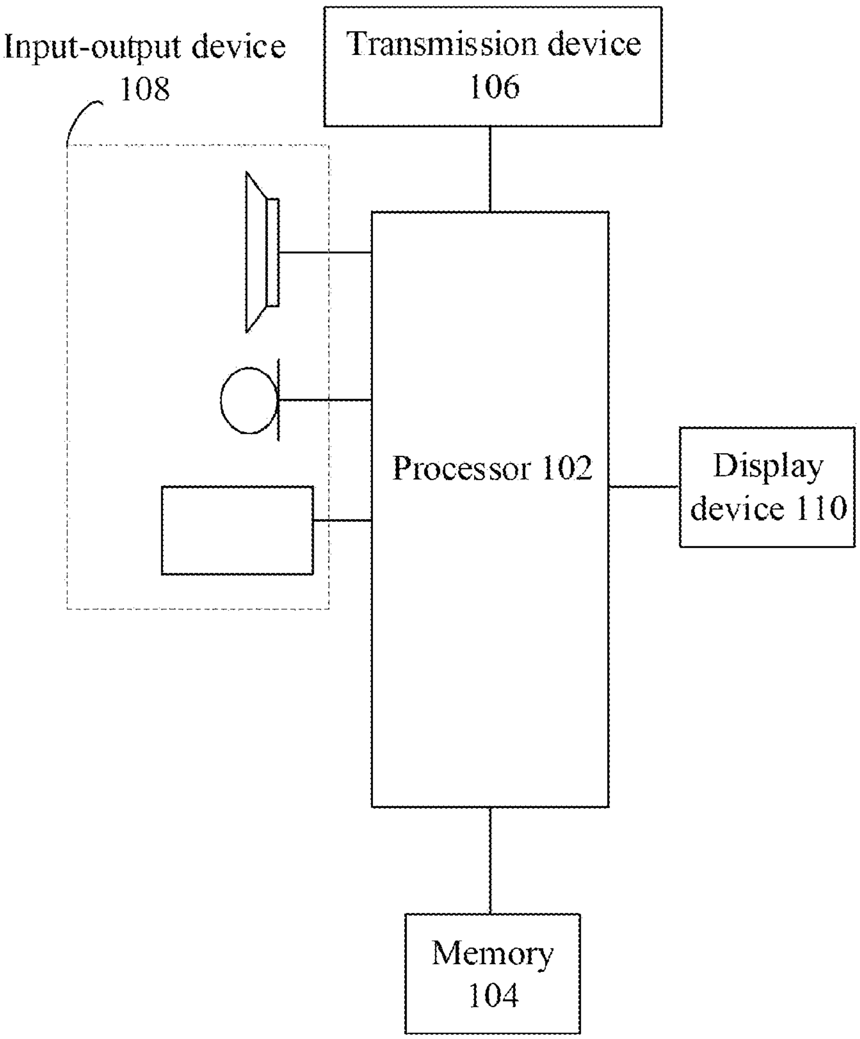
FIG. 1 is a block diagram of a hardware structure of a mobile terminal for a method for processing animation data according to an embodiment of the present disclosure.

In order to make those skilled in the art better understand solutions of the present disclosure, the technical solutions in embodiments of the present disclosure will be clearly and completely described below with reference to drawings in embodiments of the present disclosure. It is apparent that the described embodiments are only some, rather than all, of embodiments of the present disclosure. Based on embodiments of the present disclosure, all other embodiments obtained by those ordinary skilled in the art without creative work should fall within the protection scope of the present disclosure.

It should be noted that the terms "first", "second" and the like in the specification, claims and the above drawings of the present disclosure are used to distinguish similar objects, and are not necessarily used to describe a specific sequence or a precedence order. It will be appreciated that data used in such a way may be exchanged under appropriate conditions, so that embodiments of the present disclosure described here can be implemented in a sequence other than those illustrated or described here. In addition, the terms "include" and "have" and any variations thereof are intended to cover non-exclusive inclusions. For example, it is not limited for processes, methods, systems, product or devices containing a series of steps or units to clearly list those steps or units, and other steps or units which are not clearly listed or are inherent to these processes, methods, products or devices may be included instead.

First of all, some nouns or terms that appear during the description of embodiments of the present disclosure are applicable to the following explanations.

(1) Skeletal Animation: it belongs to a kind of model animation (which includes a vertex animation and the skeletal animation), and the skeletal animation typically includes data of two parts of a skeleton and a skinned mesh. Interconnected skeletons make up a skeleton framework structure, and animation is generated by changing orientations and positions of skeletons.

(2) Skinned Mesh: it refers to attaching (binding) vertices of the mesh to the skeletons, and each vertex can be controlled by a plurality of skeletons, so that positions of vertices at joints change due to being subject to the pulling of parent and child skeletons at the same time to eliminate gaps. The skinned mesh is jointly defined by each skeleton and a weight that each vertex is influenced by individual skeletons.

(3) Neural Network: it is a mathematical model or computational model that imitates a structure and functions of a biological neural network (such as a central nervous system of an animal, especially a brain) in the field of machine learning and cognitive science, which is used to estimate or approximate a function.

(4) Inverse kinematics (referred to as IK for short): it is a method that first determines a position of a child skeleton, and then inversely deduces positions of parent skeletons at multiple levels on a skeleton chain where the child skeleton is located, so as to determine the entire skeleton chain, that is, a process of inversely solving a state of the entire skeleton chain by determining a state of the skeleton end.

(5) Animation Fusion: it refers to a processing manner that enables a multi-frame animation clip to contribute to a final posture of a virtual character model. More precisely, it refers to combining a plurality of input postures to generate the final posture of the skeleton.

(6) Animation Retargeting: it is a function that allows animation to be reused between virtual character models that share the same skeleton framework resource but have greatly different proportions. The retargeting can prevent a skeleton framework that generates the animation from losing a proportion or deforming unnecessarily when using animations from virtual character models with different profiles.

At present, skeletal animation used in game scenes provided in the related arts typically has the following problems.

(1) There are a large number of game character animations, whether respective virtual character model perform the same action or different actions, it is necessary to store, for each virtual character model, corresponding skeletal animation data for describing all skeletal position information, which requires to occupy a huge storage space. If motion matching or the like is used to load animation resources, it will not only take a long time for loading, but also take up the extensive memory.

(2) End skeletons of the skeletal animations may cause a decrease in skeletal animation end precision during a compression process of the skeletal animation data, and if the skeletal animation data is not compressed, it will take up a large amount of storage space. After the skeletal animation data is compressed, there is an error in relative positions of the skeletons. Since position information of a skeleton is defined relative to a parent skeleton, the error will gradually accumulate, which will cause a large error in the skeleton end.

(3) When the virtual character model performs motion transition, the fusion of postures presented by a multi-frame character animation will exist on a skeleton framework of the virtual character model. Especially for a complex action transition, there may be postures presented by dozens of character animations participating in the fusion at the same time, which involves a large amount of computation.

(4) Skeletal animation data of different skeletal structures cannot be reused on skeleton frameworks of different virtual character models. If it is necessary to migrate the skeletal animation data from one virtual character model to another, the skeletal animation data needs to be redirected to specify a mapping relationship between the two sets of skeletons, but the reuse effect is poor.

No effective solution to the above problems has been proposed yet.

According to an embodiment of the present disclosure, there is provided a method for processing animation data. It should be noted that steps shown in flowcharts of the drawings can be executed in a computer system such as a set of computer-executable instructions. Also, although logical orders are shown in the flowcharts, in some cases the steps shown or described may be performed in orders different from those shown or described herein.

The method for processing the animation data in an embodiment of the present disclosure may run on a terminal device or a server. The terminal device may be a local terminal device. When the method for processing the animation data runs on the server, the method can be implemented and executed based on a cloud interaction system, where the cloud interaction system includes a server and a client device.

In some implementations of the present disclosure, various cloud applications, such as cloud games, can be run under the cloud interaction system. Taking cloud games as an example, a cloud game refers to a game method based on cloud computing. In the running mode of the cloud games, the running body of the game program and the presentation body of the game screen are separated. The storage and operation of the method for processing the animation data are completed on the cloud game server. The client device is used for data receiving and transmission, and presentation of the game screen. For example, the client device can be a display device with a data transmission function close to the user side, such as a mobile terminal, a TV, a computer, a handheld computer, etc. The terminal device for information processing is a cloud game server in the cloud. When playing the game, the player operates the client device to send operation instructions to the cloud game server, and the cloud game server runs the game according to the operation instructions, encodes and compresses the game screen and other data, returns it to the client device through the network, and finally decodes and outputs the game screen through the client device.

In some implementations of the present disclosure, the terminal device may be a local terminal device. Taking a game as an example, the local terminal device stores a game program and is used to present a game screen. The local terminal device is used to interact with the player through a graphical user interface, that is, the game program is downloaded, installed and executed through an electronic device conventionally. The graphical user interface may be provided to the player by the local terminal device in various ways. For example, the graphical user interface may be rendered and displayed on the display screen of the terminal, or may be provided to the player through holographic projection. For example, the local terminal device may include a display screen and a processor. The display screen is used for presenting a graphical user interface including game screens, and the processor is used for running the game, generating the graphical user interface, and controlling display of the graphical user interface on the display.

In an implementation of the present disclosure, there is provided a method for processing animation data in embodiments of the present disclosure. A graphical user interface is provided through a terminal device, and the terminal device may be the aforementioned local terminal device or a client device in the aforementioned cloud interaction system.

Taking a mobile terminal running on the local terminal device as an example, the mobile terminal may be a smart phone (such as an Android mobile phone, an iOS mobile phone, etc.), a tablet computer, a PDA, a Mobile Internet Device (MID), a PAD, and a game console, etc. FIG. 1 is a block diagram of a hardware structure of a mobile terminal for a method for processing animation data according to an embodiment of the present disclosure. As shown in FIG. 1, the mobile terminal may include one or more (only one is shown in FIG. 1) processors 102 (the processor 102 may include, but is not limited to, a central processing unit (CPU), a graphics processing unit (GPU), a digital signal processing (DSP) chip, a micro-processing unit (MCU), a field programmable gate array (FPGA), a neural network processing unit (NPU), a tensor processing unit (TPU), an artificial intelligence (AI) type processor, etc.) and a memory 104 configured to store data. In some embodiments of the present disclosure, the above-mentioned mobile terminal may further include a transmission device 106 for communication functions, an input-output device 108 and a display device 110. Those skilled in the art can understand that the structure shown in FIG. 1 is only for illustration, and it does not limit the structure of the above-mentioned mobile terminal. For example, the mobile terminal may further include more or less components than those shown in FIG. 1, or have a different configuration than that shown in FIG. 1.

The memory 104 may be configured to store computer programs, for example, software programs and modules of application software, such as computer programs corresponding to the method for processing the animation data in embodiments of the present disclosure. The processor 102 executes various functional applications and data processing by running the computer programs stored in the memory 104, that is to implement the method for processing the animation data described above. The memory 104 may include a high-speed random access memory, and may also include a non-volatile memory, such as one or more magnetic storage devices, flash memories, or other non-volatile solid-state memories. In some embodiments, the memory 104 may further include a memory located remotely from the processor 102, and these remote memories may be connected to the mobile terminal through a network. Examples of such networks include, but are not limited to, the Internet, an intranet, a local area network, a mobile communication network, and combinations thereof.

The transmission device 106 is configured to receive or transmit data via a network. The specific example of the above-mentioned network may include a wireless network provided by a communication provider of the mobile terminal. In an example, the transmission device 106 includes a Network Interface Controller (NIC), which can be connected to other network devices through a base station so as to communicate with the Internet. In an example, the transmission device 106 may be a Radio Frequency (RF) module, which is configured to communicate with the Internet in a wireless manner.

An input of the input-output device 108 may come from a plurality of Human Interface Devices (HIDs), for example, a keyboard, a mouse, a gamepad, other specialized game controllers (e.g., a steering wheel, a fishing rod, a dancing mat, a remote control, etc.). In addition to providing input functions, some human interface devices may also provide output functions, such as a force feedback and vibration of a gamepad, and an audio output of a controller.

The display device 110 may be, for example, a head-up display (HUD), a touch screen-style liquid crystal display (LCD), and a touch display (also referred to as a "touch screen" or "touch display"). The liquid crystal display may enable the user to interact with the user interface of the mobile terminal. In some embodiments, the above-mentioned mobile terminal has a graphical user interface (GUI), and the user can perform human-computer interaction with the GUI by touching finger contacts and/or gestures on the touch-sensitive surface, where the human-computer interaction function in some embodiments of the present disclosure includes the following interactions: creating a web page, drawing, word processing, making an electronic document, gaming, a video conferencing, instant messaging, sending and receiving an e-mail, calling interface, playing digital video, playing digital music and/or web browsing, etc. Executable instructions for performing the above human-computer interaction functions are configured/stored in one or more processor-executable computer program products or readable storage medium.

Figure 2:
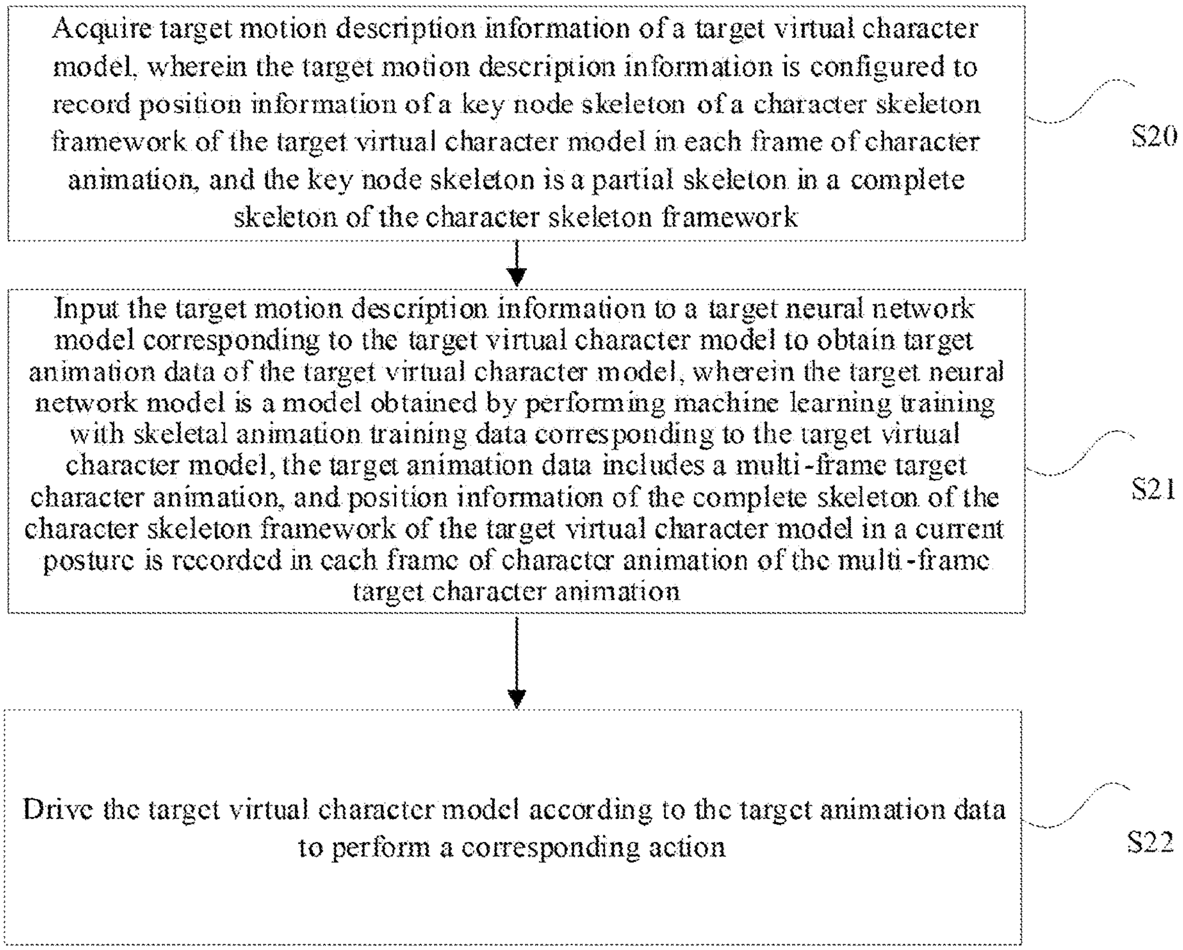
FIG. 2 is a flowchart of a method for processing animation data according to an embodiment of the present disclosure.

In embodiments of the present disclosure, there is provide a method for processing animation data running on the above-mentioned mobile terminal. FIG. 2 is a flowchart of a method for processing animation data according to an embodiment of the present disclosure, and as shown in FIG. 2, the method includes steps S20 to S22.

In the step S20, target motion description information of a target virtual character model is acquired, the target motion description information is configured to record position information of a key node skeleton of a character skeleton framework of the target virtual character model in each frame of character animation, and the key node skeleton is a partial skeleton in a complete skeleton of the character skeleton framework.

The target virtual character model may be a virtual figure model, a virtual animal model, and the like. The target motion description information is configured to record the position information of the key node skeleton of the character skeleton framework of the target virtual character model in each frame of character animation. The key node skeleton is the partial skeleton in the complete skeleton (that is, a whole body skeleton) of the character skeleton framework. In a game running stage, a target control touched by a game player may be determined in response to a touch operation performed on a graphical user interface of a mobile terminal, whereby a control instruction corresponding to the target control is generated. Then, the mobile terminal controls, according to the generated control instruction, the target virtual character model to perform the corresponding action, so as to acquire the corresponding target description information when it is detected that the target virtual character model performs the corresponding action. For example, in response to the touch operation performed on the graphical user interface of the mobile terminal, it is determined that the game player touches a jump control, whereby a jump instruction corresponding to the jump control is generated. Then, the mobile terminal controls, according to the generated jump instruction, the target virtual character model to perform a corresponding jump action, so as to acquire the corresponding target description information when it is detected that the target virtual character model performs the corresponding jump action. The target motion description information will be input to a target neural network model corresponding to the target virtual character model to obtain the target animation data of the target virtual character model, and then the target virtual character model is driven to perform the corresponding action according to the target animation data.

In an embodiment of the present disclosure, the key node skeleton is an end skeleton in the complete skeleton. That is, the target motion description information may be a series of key points on the character skeleton framework of the virtual character model, which are responsible for recording position data of a skeleton framework end (for example, a human skeleton framework end is typically left and right wrists, left and right ankles, a hip and a head, etc.), so that the animation data is separated from a specific skeleton framework, and thus different stylized actions can be generated according to different skeleton frameworks. Since the target motion description information mainly records a small amount of position data of the skeleton framework end, it will greatly reduce the storage space occupied by the skeletal animation data and reduce the number of animations that need to be loaded.

In addition, since the target motion description information is responsible for storing the position data of the skeleton framework end, the animation data is greatly simplified, and since the animation data is separated from the specific skeleton framework information, the animation data is made universal, which can be applied to character skeleton frameworks of other virtual character models of the same type. Moreover, since the target animation data is stored by frame, and each frame records the position data of the skeleton framework end of the target virtual character model in a character posture of the current moment, the corresponding position data of the skeleton framework end can be acquired from the target animation data according to time information of a current playback progress.

In the step S21, the target motion description information is input to a target neural network model corresponding to the target virtual character model to obtain target animation data of the target virtual character model. The target neural network model is a model obtained by performing machine learning training with skeletal animation training data corresponding to the target virtual character model, and the target animation data includes a multi-frame target character animation. Position information of the complete skeleton of the character skeleton framework of the target virtual character model in a current posture is recorded in each frame of character animation of the multi-frame target character animation.

The target neural network model is a model obtained by performing the machine learning training with the skeletal animation training data corresponding to the target virtual character model. The skeletal animation training data is set as an input parameter of an initial neural network model, so that the target neural network model can be obtained by training. Character skeleton frameworks of different virtual character models correspond to different target neural network models, respectively.

The target animation data includes the multi-frame target character animation, and each frame of character animation of the multi-frame target character animation records the position information of the complete skeleton of the character skeleton framework of the target virtual character model in the current posture. A small amount of position data of the skeleton framework end recorded by the use of the target motion description information can restore the action performed by the target virtual character model. By inputting the position data of the skeleton framework end to the target neural network model for prediction, whole-body skeleton information of the target virtual character model can be obtained, whereby the target motion description information is used to restore a whole-body skeleton state, so as to obtain the target animation data of the target virtual character model. In order to conform to a skeleton framework posture of each virtual character model, it is necessary to use motion capture to acquire the animation training data, and use the animation training data to train the target neural network model to improve prediction accuracy. Since the input target motion description information is not the entire skeleton data, it is suitable for skeleton frameworks of various virtual character models.

In order to acquire a complete posture (that is, all skeleton positions) of the target virtual character model in each frame of animation through the position data of the skeleton framework end, the target neural network model can be used to predict the complete posture in each frame of animation. The position data of the skeleton framework end obtained through the posture matching processing is inputted to the target neural network model corresponding to the character skeleton framework of the target virtual character model, so as to predict all skeleton positions of the target virtual character model, thereby restoring the complete posture in each frame of animation.

Since the neural network model corresponding to the character skeleton framework of the target virtual character model is only used to predict all skeleton positions of the target virtual character model, the prediction of different character skeleton frameworks requires training of respective neural network models, respectively. The accurate prediction of the target neural network model relies on inputting a large amount of animation training data. The large amount of animation training data (that is, original animation data that records all skeleton positions) may be generated for the target virtual character model in a manner such as the motion capture. For each neural network model, the more animation data used for training and the richer the types of the animation data used for training, the better the training effect.

In the step S22, the target virtual character model is driven to perform a corresponding action according to the target animation data.

For example, the target virtual character model is driven to perform a corresponding walking action according to walking animation data, or perform a corresponding running action according to running animation data, or perform a corresponding jumping action according to jumping animation data.

Through the above steps, the following manner may be used: the target motion description information of the target virtual character model is acquired, the target motion description information records the position information of the key node skeleton of the character skeleton framework of the target virtual character model in each frame of character animation, and the key node skeleton is the partial skeleton in the complete skeleton of the character skeleton framework. The target motion description information is inputted to the target neural network model corresponding to the target virtual character model to obtain the target animation data of the target virtual character model, the target neural network model is the model obtained by performing the machine learning training with the skeletal animation training data corresponding to the target virtual character model, the target animation data includes the multi-frame target character animation, and the position information of the complete skeleton of the character skeleton framework of the target virtual character model in the current posture is recorded in each frame of character animation of the multi-frame target character animation. The target virtual character model is driven to perform the corresponding action according to the target animation data. In this way, the position information of the key node skeleton recorded in the target motion description information is used to restore the action performed by the target virtual character model, and the target motion description information is inputted to the target neural network model for prediction, so as to obtain the target animation data of the target virtual character model, thereby achieving the purpose of driving the target virtual character model to perform the corresponding action. Thus, the technical effect of effectively reducing the loading time of the skeletal animation and reducing the memory occupied by the skeletal animation is achieved, thereby solving the technical problems in the related arts that the skeletal animation used in the provided game scene not only takes the long loading time, but also takes up the extensive memory.

In some embodiments of the present disclosure, the acquiring the target motion description information of the target virtual character model in the step S20 may include the following execution steps.

Basic motion description information of a basic virtual character model is acquired, and the basic virtual character model and the target virtual character model are the same type of character model.

The same type of character model means that the basic virtual character model and the target virtual character model belong to the same biological classification. In an example, the basic virtual character model and the target virtual character model belong to the same figure classification. For example, the basic virtual character model is a virtual adult model, and the target virtual character model is a virtual child model. In another example, the basic virtual character model and the target virtual character model belong to the same animal classification. For example, the basic virtual character model is a virtual cheetah model, and the target virtual character model is a virtual hunting dog model.

In a process of acquiring the basic motion description information of the basic virtual character model, the original animation data may be acquired first, and then the basic motion description information of the basic virtual character model is determined from the original animation data according to a motion description information calculation manner corresponding to the basic virtual character model. Specifically, firstly, the original animation data may be collected by means of motion capture, etc.; secondly, a skeleton joint position is acquired from the collected original animation data; and then, the position data of the skeleton framework end is obtained by the calculation of the skeleton joint position. It should be noted that the motion description information can be applied to character skeleton frameworks of the same type of character models.

Figure 3:
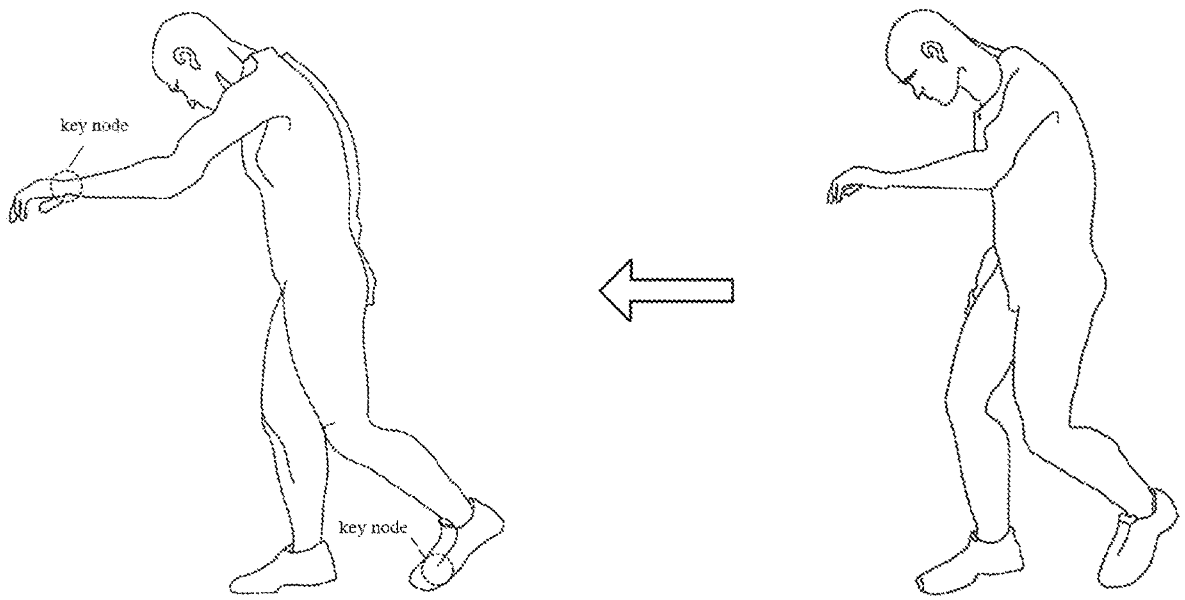
FIG. 3 is a schematic diagram of generating motion description information according to an embodiment of the present disclosure.

FIG. 3 is a schematic diagram of generating motion description information according to an embodiment of the present disclosure. As shown in FIG. 3, the right side shows that the original animation data of the virtual character model collected by means of motion capture, etc., and the position data (that is, key points contained in the motion description information) of the skeleton framework end shown on the left side is obtained by acquiring the skeleton joint position from the collected original animation data and by means of the calculation of the skeleton joint position. The key points are acquired through a preset calculation manner, and the calculation manner is used to specify a skeleton joint involved in the calculation and the calculation manner, and the same set of calculation manners is used by the same type of character skeleton frameworks to generate the key points. For example, virtual human models share a set of calculation manners, virtual reptile models share another set of calculation manners, and a position of a foot key point is obtained by a foot joint of the human skeleton framework through the preset calculation manner.

In addition, since in a model space, all skeleton joints or key point positions share a coordinate system of this space, and in a joint space, a coordinate system is established on a parent joint and a child joint position coordinate depends on the parent joint, the position data of the skeleton framework end is defined in the model space rather than the joint space. Moreover, since the position data of the skeleton framework end is defined in the model space, an animation precision loss issue can be effectively overcame compared with the data compression and floating-point precision limitations adopted in the related arts generating an error which will accumulate to make the end skeleton less accurate.

A correspondence between the basic virtual character model and the target virtual character model is determined.

The use of the neural network model can make an animation effect to be rendered in different styles on different character skeleton frameworks of the same type of virtual character models. Since the neural network model is trained through part of the original animation data of the virtual character model, its output will be affected by the training data, which is conducive to maintaining an action style of the character model. For example, for the same running animation, there will be a difference between an action style of the virtual adult character model and an action style of the virtual child character model, so as to reflect an adult motion characteristic and a child motion characteristic, respectively.

In a process of determining the correspondence between the basic virtual character model and the target virtual character model, a proportional relationship between the basic virtual character model and the target virtual character model can be determined according to a basic model size of the basic virtual character model and a target model size of the target virtual character model.

The basic motion description information is adjusted according to the correspondence to acquire the target motion description information of the target virtual character model.

In the process of adjusting the basic motion description information according to the correspondence to acquire the target motion description information of the target virtual character model, skeleton end position information in the basic motion description information can be adjusted according to the proportional relationship to acquire skeleton end position information in the target motion description information.

Since body proportions of character skeleton frameworks of different virtual character models are different, it is necessary to scale and adjust the position data of the skeleton framework end according to body proportion information, in order to apply the position data of the skeleton framework end to different character skeleton frameworks of the same type of virtual character models. For example, if it is desirable to apply the position data of the skeleton framework end obtained from the virtual adult character model to a different character skeleton framework of the virtual child character model with the same type as the virtual adult character model, then due to a difference in a skeleton joint size between the virtual adult character model and the virtual child character model, it is necessary to scale and adjust the position data of the skeleton framework end according to the body proportion information between the adult and the child (that is, posture matching), in order to apply the position data of the skeleton framework end obtained from the virtual adult character model to the different character skeleton framework of the virtual child character model with the same type as the virtual adult character model. In this way, the adjusted position data of the skeleton framework end can be applied to the different character skeleton framework of the virtual child character model with the same type as the virtual adult character model.

In an embodiment of the present disclosure, the prediction is performed by the neural network model to obtain all skeleton positions of a specified virtual character model, and a complete posture of the specified virtual character model in each frame of animation can be formed. If there are additional constraints and restrictions on the specified virtual character model in a specific game scene (e.g., a left foot of the specified virtual character model needs to step on a virtual ground in the game scene), it is required to correct a specific posture of the specified virtual character model according to the constraints and restrictions. The constraints and restrictions generally act on the position data of the skeleton framework end, and thus it is equivalent to redetermining the position data of the skeleton framework end. After the position data of the skeleton framework end is redetermined, IK solving may be performed using the redetermined position data of the skeleton framework end to correct and re-determine all the skeleton positions.

Figure 4:
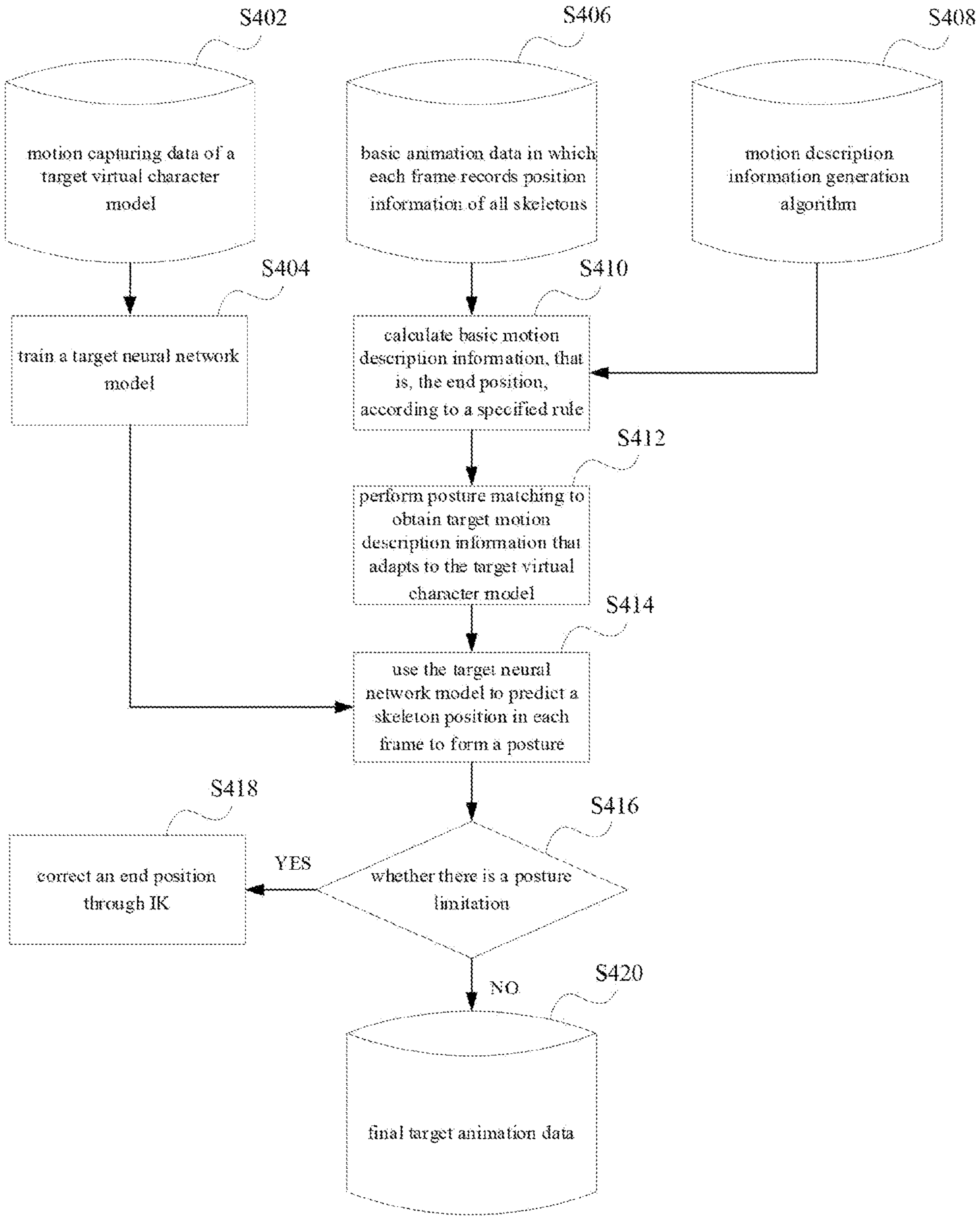
FIG. 4 is a flowchart of acquiring target animation data of a virtual character model based on a neural network model according to an embodiment of the present disclosure.

FIG. 4 is a flowchart of acquiring target animation data of a virtual character model based on a neural network model according to an embodiment of the present disclosure. As shown in FIG. 4, the process may include processing steps S402 to S420.

In the step S402, a large amount of animation training data (that is, original animation data recording all skeleton positions) is generated for a target virtual character model by means of motion capture, etc.

In the step S404, since a target neural network model corresponding to a character skeleton framework of the target virtual character model is only used to predict all the skeleton positions of the target virtual character model, the prediction of different character skeleton frameworks requires training of respective neural network models, respectively. The accurate prediction of the target neural network model relies on inputting the large amount of animation training data.

In the step S406, basic animation data of a basic virtual character model is collected by means of motion capture, etc.

In the step S408, a motion description information generation algorithm is acquired.

In the step S410, the motion description information generation algorithm is used to first acquire a skeleton joint position from the collected basic animation data, and then obtain position data of a skeleton framework end, that is, basic motion description information, by means of the calculation of the skeleton joint position.

In the step S412, since body proportions of character skeleton frameworks of different virtual character models are different, it is necessary, in order to apply the position data of the skeleton framework end to different character skeleton frameworks of the same type of virtual character models, to perform posture matching on the position data of the skeleton framework end according to body proportion information, so as to obtain target motion description information.

In the step S414, position information of a key node skeleton recorded in the target motion description information is used to restore an action performed by the target virtual character model, and the target motion description information is input into the target neural network model for prediction, and then target animation data of the target virtual character model is obtained.

In the step S416, it is determined whether the target virtual character model has an additional constraint and restriction in a specific game scene, and if so, turn to the step S418, and if not, proceed to the step S420.

In the step S418, a specific posture of the target virtual character model is corrected according to the constraint and restriction. The constraint and restriction generally act on the position data of the skeleton framework end, and thus it is equivalent to re-determining the position data of the skeleton framework end. After the position data of the skeleton framework end is re-determined, IK solving may be performed using the re-determined position data of the skeleton framework end to correct and re-determine all the skeleton positions.

In the step S420, the target animation data of the target virtual character model is finally obtained, so as to drive the target virtual character model to perform the corresponding action according to the target animation data.

Figure 5:
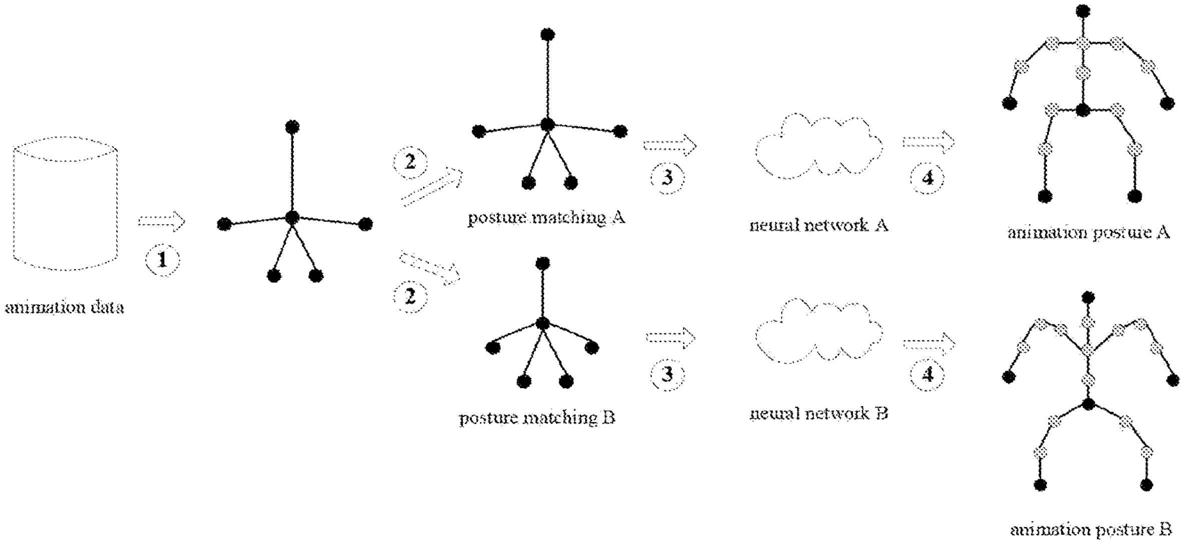
FIG. 5 is a schematic diagram of predicting a complete posture of a virtual character model based on a neural network model according to an embodiment of the present disclosure.

FIG. 5 is a schematic diagram of predicting a complete posture of a virtual character model based on a neural network model according to an embodiment of the present disclosure. As shown in FIG. 5, firstly, the position data (i.e., the motion description information) of the skeleton framework end at a particular frame is obtained by sampling the original animation data according to time information of a current animation playback progress. Secondly, posture matching processing is performed between the position data of the skeleton framework end obtained by sampling and skeleton frameworks of virtual character model A and virtual character model B, respectively, so as to obtain the matched end position data corresponding to the virtual character model A and the matched end position data corresponding to the virtual character model B, respectively. Then, the matched end position data corresponding to the virtual character model A is input to neural network model A corresponding to the virtual character model A to output all skeleton postures corresponding to the virtual character model A, and the matched end position data corresponding to the virtual character model B is input to neural network model B corresponding to the virtual character model B to output all skeleton postures corresponding to the virtual character model B. Finally, an IK technology is used to adjust all skeleton positions to obtain a final animation posture.

In an embodiment of the present disclosure, the position information of the character skeleton framework end of the target virtual character model in the continuous multi-frame character animation can be obtained from the target animation data based on the time information corresponding to the playback progress of the target animation data; secondly, animation fusion processing is performed on the obtained position information of the character skeleton framework end to obtain a fusion result; then, the target neural network model is used to analyze the fusion result to predict the fused animation data of the target virtual character model. That is, when it is necessary to fuse respective animation postures of the virtual character model in the continuous multi-frame animation, the fusion calculation can only be performed on the position data of the skeleton framework end to speed up a fusion speed. Especially, when the virtual character model is in a complex motion state, it is necessary to fuse individual animation postures in up to a dozen frames of animation, and the animation fusion speed can be greatly improved by only performing the fusion calculation on the position data of the skeleton framework end.

From the description of the above embodiments, those skilled in the art can clearly understand that the method according to the above embodiments may be implemented by means of software plus a necessary general hardware platform, and may also be implemented by hardware. Based on this understanding, the technical solutions of the present disclosure essentially or the parts that make contributions to the related arts can be embodied in the form of a software product, and the computer software product is stored in a storage medium (such as a ROM/RAM, a magnetic disk, a CD-ROM), including several instructions to enable a terminal device (such as a mobile phone, a computer, a server, or a network device, etc.) to execute the method described in the various embodiments of the present disclosure.

Figure 6:
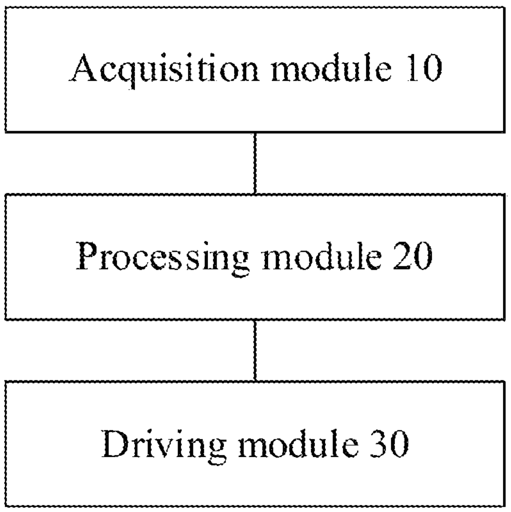
FIG. 6 is a structural block diagram of a device for processing animation data according to an embodiment of the present disclosure.

In embodiments of the present disclosure, there is further provided a device for processing animation data, which is configured to implement the above-mentioned embodiments, which has been described and is not be repeated. As used below, the term "module" may be a combination of software and/or hardware that implements a predetermined function. Although the device described in the following embodiments is implemented in software, implementations in hardware or a combination of software and hardware are also possible and contemplated FIG. 6 is a structural block diagram of a device for processing animation data according to an embodiment of the present disclosure. As shown in FIG. 6, the device includes: an acquisition module 10, configured to acquire target motion description information of a target virtual character model, wherein the target motion description information is configured to record position information of a key node skeleton of a character skeleton framework of the target virtual character model in each frame of character animation, and the key node skeleton is a partial skeleton in a complete skeleton of the character skeleton framework; a processing module 20, configured to input the target motion description information to a target neural network model corresponding to the target virtual character model to obtain target animation data of the target virtual character model, wherein the target neural network model is a model obtained by performing machine learning training with skeletal animation training data corresponding to the target virtual character model, the target animation data includes a multi-frame target character animation, and position information of the complete skeleton of the character skeleton framework of the target virtual character model in a current posture is recorded in each frame of character animation of the multi-frame target character animation; and a driving module 30, configured to drive the target virtual character model according to the target animation data to perform a corresponding action.

In some embodiments of the present disclosure, the key node skeleton is an end skeleton in the complete skeleton.

In some embodiments of the present disclosure, the acquisition module 10 is configured to acquire basic motion description information of a basic virtual character model, wherein the basic virtual character model and the target virtual character model are the same type of character models; determine a correspondence between the basic virtual character model and the target virtual character model; and adjust the basic motion description information according to the correspondence to acquire the target motion description information of the target virtual character model.

In some embodiments of the present disclosure, the same type of character models indicates that the basic virtual character model and the target virtual character model belong to the same biological classification.

In some embodiments of the present disclosure, the acquisition module 10 is configured to determine a proportional relationship between the basic virtual character model and the target virtual character model according to a basic model size of the basic virtual character model and a target model size of the target virtual character model.

In some embodiments of the present disclosure, the acquisition module 10 is configured to adjust skeleton end position information in the basic motion description information according to the proportional relationship to acquire skeleton end position information in the target motion description information.

In some embodiments of the present disclosure, the acquisition module 10 is configured to acquire original animation data; and determine the basic motion description information of the basic virtual character model from the original animation data according to a motion description information calculation manner corresponding to the basic virtual character model.

It should be noted that the above modules can be implemented by software or hardware, and the latter can be implemented in the following ways, but not limited to this: the above modules are all located in the same processor; or, the above modules may be located in different processors in any combination form.

Embodiments of the present disclosure further provide a non-transitory storage medium having a computer program stored thereon, and the computer program is configured to execute steps of any one of the above-mentioned method embodiments when running.

In some embodiments of the present disclosure, the above-mentioned non-transitory storage medium may be configured to store a computer program for performing the following steps:

acquiring target motion description information of a target virtual character model, wherein the target motion description information is configured to record position information of a key node skeleton of a character skeleton framework of the target virtual character model in each frame of character animation, and the key node skeleton is a partial skeleton in a complete skeleton of the character skeleton framework;

inputting the target motion description information to a target neural network model corresponding to the target virtual character model to obtain target animation data of the target virtual character model, wherein the target neural network model is a model obtained by performing machine learning training with skeletal animation training data corresponding to the target virtual character model, the target animation data includes a multi-frame target character animation, and position information of the complete skeleton of the character skeleton framework of the target virtual character model in a current posture is recorded in each frame of character animation of the multi-frame target character animation; and driving the target virtual character model according to the target animation data to perform a corresponding action.

In some embodiments of the present disclosure, the key node skeleton is an end skeleton in the complete skeleton.

In some embodiments of the present disclosure, the acquiring the target motion description information of the target virtual character model includes: acquiring basic motion description information of a basic virtual character model, wherein the basic virtual character model and the target virtual character model are the same type of character models; determining a correspondence between the basic virtual character model and the target virtual character model; and adjusting the basic motion description information according to the correspondence to acquire the target motion description information of the target virtual character model.

In some embodiments of the present disclosure, the same type of character models indicates that the basic virtual character model and the target virtual character model belong to the same biological classification.

In some embodiments of the present disclosure, the determining the correspondence between the basic virtual character model and the target virtual character model includes: determining a proportional relationship between the basic virtual character model and the target virtual character model according to a basic model size of the basic virtual character model and a target model size of the target virtual character model.

In some embodiments of the present disclosure, the adjusting the basic motion description information according to the correspondence to acquire the target motion description information of the target virtual character model includes: adjusting skeleton end position information in the basic motion description information according to the proportional relationship to acquire skeleton end position information in the target motion description information.

In some embodiments of the present disclosure, the acquiring the basic motion description information of the basic virtual character model includes: acquiring original animation data; and determining the basic motion description information of the basic virtual character model from the original animation data according to a motion description information calculation manner corresponding to the basic virtual character model.

For specific examples in embodiments of the present disclosure, reference may be made to the examples described in the foregoing embodiments and optional implementations, and details are not repeated in this embodiment.

In some embodiments of the present disclosure, the above-mentioned non-transitory storage medium may include but is not limited to various mediums that can store the computer program, such as a U disk, a Read-Only Memory (ROM), a Random Access Memory (RAM), a mobile hard disk, a magnetic disk or an optical disk.

In at least some embodiments of the present disclosure, the following manner may be used: the target motion description information of the target virtual character model is acquired, the target motion description information records the position information of the key node skeleton of the character skeleton framework of the target virtual character model in each frame of character animation, and the key node skeleton is the partial skeleton in the complete skeleton of the character skeleton framework. The target motion description information is inputted to the target neural network model corresponding to the target virtual character model to obtain the target animation data of the target virtual character model, the target neural network model is the model obtained by performing the machine learning training with the skeletal animation training data corresponding to the target virtual character model, the target animation data includes the multi-frame target character animation, and the position information of the complete skeleton of the character skeleton framework of the target virtual character model in the current posture is recorded in each frame of character animation of the multi-frame target character animation. The target virtual character model is driven to perform the corresponding action according to the target animation data. In this way, the position information of the key node skeleton recorded in the target motion description information is used to restore the action performed by the target virtual character model, and the target motion description information is inputted to the target neural network model for prediction, so as to obtain the target animation data of the target virtual character model, thereby achieving the purpose of driving the target virtual character model to perform the corresponding action. Thus, the technical effect of effectively reducing the loading time of the skeletal animation and reducing the memory occupied by the skeletal animation is achieved, thereby solving the technical problems in the related arts that the skeletal animation used in the provided game scene not only takes the long loading time, but also takes up the extensive memory.

Embodiments of the present disclosure further provide an electronic device, including a memory and a processor. A computer program is stored in the memory, and the processor is configured to run the computer program to execute steps in any one of the above method embodiments.

In some embodiments of the present disclosure, the electronic device may further include a transmission device and an input-output device, and the transmission device is connected to the above-mentioned processor, and the input-output device is connected to the above-mentioned processor.

In some embodiments of the present disclosure, the processor may be configured to execute the following steps through a computer program:

acquiring target motion description information of a target virtual character model, wherein the target motion description information is configured to record position information of a key node skeleton of a character skeleton framework of the target virtual character model in each frame of character animation, and the key node skeleton is a partial skeleton in a complete skeleton of the character skeleton framework;

inputting the target motion description information to a target neural network model corresponding to the target virtual character model to obtain target animation data of the target virtual character model, wherein the target neural network model is a model obtained by performing machine learning training with skeletal animation training data corresponding to the target virtual character model, the target animation data includes a multi-frame target character animation, and position information of the complete skeleton of the character skeleton framework of the target virtual character model in a current posture is recorded in each frame of character animation of the multi-frame target character animation; and driving the target virtual character model according to the target animation data to perform a corresponding action.

In some embodiments of the present disclosure, the key node skeleton is an end skeleton in the complete skeleton.

In some embodiments of the present disclosure, the acquiring the target motion description information of the target virtual character model includes: acquiring basic motion description information of a basic virtual character model, wherein the basic virtual character model and the target virtual character model are the same type of character models; determining a correspondence between the basic virtual character model and the target virtual character model; and adjusting the basic motion description information according to the correspondence to acquire the target motion description information of the target virtual character model.

In some embodiments of the present disclosure, the same type of character models indicates that the basic virtual character model and the target virtual character model belong to the same biological classification.

In some embodiments of the present disclosure, the determining the correspondence between the basic virtual character model and the target virtual character model includes: determining a proportional relationship between the basic virtual character model and the target virtual character model according to a basic model size of the basic virtual character model and a target model size of the target virtual character model.

In some embodiments of the present disclosure, the adjusting the basic motion description information according to the correspondence to acquire the target motion description information of the target virtual character model includes: adjusting skeleton end position information in the basic motion description information according to the proportional relationship to acquire skeleton end position information in the target motion In some embodiments of the present disclosure, the acquiring the basic motion description information of the basic virtual character model includes: acquiring original animation data; and determining the basic motion description information of the basic virtual character model from the original animation data according to a motion description information calculation manner corresponding to the basic virtual character model.

For specific examples in embodiments of the present disclosure, reference may be made to examples described in the foregoing embodiments and implementations, and details are not repeated here.

In at least some embodiments of the present disclosure, the following manner may be used: the target motion description information of the target virtual character model is acquired, the target motion description information records the position information of the key node skeleton of the character skeleton framework of the target virtual character model in each frame of character animation, and the key node skeleton is the partial skeleton in the complete skeleton of the character skeleton framework. The target motion description information is inputted to the target neural network model corresponding to the target virtual character model to obtain the target animation data of the target virtual character model, the target neural network model is the model obtained by performing the machine learning training with the skeletal animation training data corresponding to the target virtual character model, the target animation data includes the multi-frame target character animation, and the position information of the complete skeleton of the character skeleton framework of the target virtual character model in the current posture is recorded in each frame of character animation of the multi-frame target character animation. The target virtual character model is driven to perform the corresponding action according to the target animation data. In this way, the position information of the key node skeleton recorded in the target motion description information is used to restore the action performed by the target virtual character model, and the target motion description information is inputted to the target neural network model for prediction, so as to obtain the target animation data of the target virtual character model, thereby achieving the purpose of driving the target virtual character model to perform the corresponding action. Thus, the technical effect of effectively reducing the loading time of the skeletal animation and reducing the memory occupied by the skeletal animation is achieved, thereby solving the technical problems in the related arts that the skeletal animation used in the provided game scene not only takes the long loading time, but also takes up the extensive memory.

The serial numbers of embodiments of the present disclosure are only for description, and do not represent advantages or disadvantages of the embodiments.

In embodiments of the present disclosure, the description of each embodiment has its own emphasis. For parts that are not described in detail in a certain embodiment, reference may be made to related descriptions of other embodiments.

In several embodiments provided in the present disclosure, it should be understood that the disclosed technical content can be implemented in other ways. The device embodiments described above are only illustrative, for example, the division of the units may be a logical function division, and there may be other division methods in an actual implementation, for example, multiple units or components may be combined or integrated into another system, or some features can be ignored, or not implemented. On the other hand, the shown or discussed mutual coupling or direct coupling or communication connection may be through some interfaces, indirect coupling or communication connection of units or modules may be in electrical or other forms.

The units described as separate components may or may not be physically separated, and components shown as units may or may not be physical units, that is, may be located in one place, or may be distributed to multiple units. Some or all of the units may be selected according to actual needs to achieve the purpose of the solution in the embodiments.

In addition, each functional unit in each embodiment of the present disclosure may be integrated into one processing unit, or each unit may exist physically alone, or two or more units may be integrated into one unit. The integrated units may be implemented in the form of hardware, or may be implemented in the form of software functional units.

The integrated unit, if implemented in the form of a software functional unit and sold or used as an independent product, may be stored in a computer-readable storage medium. Based on the understanding, the technical solutions of the present disclosure, or the part that contributes to the related art, or all or part of the technical solutions can be embodied in the form of software products in essence, and the computer software product is stored in a storage medium, including several instructions to enable a computer device (such as a personal computer, a server, or a network device, etc.) to execute all or part of the steps of the method described in the various embodiments of the present disclosure. The aforementioned storage medium includes: a U disk, a read-only memory (ROM), a random access memory (RAM), a mobile hard disk, a magnetic disk or an optical disk and other mediums that can store program codes.

The above are only the preferred embodiments of the present disclosure. It should be pointed out that for those skilled in the art, without departing from the principles of the present disclosure, several improvements and modifications can be made, which should be regarded within the protection scope of the present disclosure.

What is claimed is:

1. A method for processing animation data, comprising:

acquiring target motion description information of a target virtual character model, wherein the target motion description information is configured to record position information of a key node skeleton of a character skeleton framework of the target virtual character model in each frame of character animation, the character skeleton framework comprises a complete skeleton of the target virtual character model, and the key node skeleton is a partial skeleton in the complete skeleton of the character skeleton framework;

inputting the target motion description information to a target neural network model corresponding to the target virtual character model to obtain target animation data of the target virtual character model, wherein the target neural network model is a model obtained by performing machine learning training with skeletal animation training data corresponding to the target virtual character model, the target animation data comprises a multi-frame target character animation, and position information of the complete skeleton of the character skeleton framework of the target virtual character model in a current posture is recorded in each frame of character animation of the multi-frame target character animation; and driving the target virtual character model according to the target animation data to perform a corresponding action, wherein inputting the target motion description information to the target neural network model corresponding to the target virtual character model to obtain the target animation data of the target virtual character model comprises:

generating animation training data for the target virtual character model by means of motion capture;

training the target neural network model corresponding to the target virtual character model;

collecting basic animation data of a basic virtual character model by means of motion capture;

acquiring a motion description information generation algorithm;

acquiring a skeleton joint position from the collected basic animation data, and obtaining basic motion description information by means of calculation of the skeleton joint position;

obtaining target motion description information by performing posture matching on the basic motion description information according to body proportion information; and inputting the target motion description information to the target neural network model corresponding to the target virtual character model to obtain the target animation data of the target virtual character model.

2. The method for processing the animation data according to claim 1, wherein the key node skeleton is an end skeleton in the complete skeleton.

3. The method for processing the animation data according to claim 1, wherein acquiring the target motion description information of the target virtual character model comprises:

acquiring basic motion description information of a basic virtual character model, wherein the basic virtual character model and the target virtual character model are the same type of character models;

determining a correspondence between the basic virtual character model and the target virtual character model; and adjusting the basic motion description information according to the correspondence to acquire the target motion description information of the target virtual character model.

4. The method for processing the animation data according to claim 3, wherein the same type of character models indicates that the basic virtual character model and the target virtual character model belong to a same biological classification.

5. The method for processing the animation data according to claim 3, wherein determining the correspondence between the basic virtual character model and the target virtual character model comprises:

determining a proportional relationship between the basic virtual character model and the target virtual character model according to a basic model size of the basic virtual character model and a target model size of the target virtual character model.

6. The method for processing the animation data according to claim 5, wherein adjusting the basic motion description information according to the correspondence to acquire the target motion description information of the target virtual character model comprises:

adjusting skeleton end position information in the basic motion description information according to the proportional relationship to acquire skeleton end position information in the target motion description information.

7. The method for processing the animation data according to claim 3, wherein acquiring the basic motion description information of the basic virtual character model comprises:

acquiring original animation data; and determining the basic motion description information of the basic virtual character model from the original animation data according to a motion description information calculation manner corresponding to the basic virtual character model.

8. A non-transitory storage medium having a computer program stored thereon, wherein the computer program is configured to perform the following operations when running:

acquiring target motion description information of a target virtual character model, wherein the target motion description information is configured to record position information of a key node skeleton of a character skeleton framework of the target virtual character model in each frame of character animation, the character skeleton framework comprises a complete skeleton of the target virtual character model, and the key node skeleton is a partial skeleton in the complete skeleton of the character skeleton framework;

inputting the target motion description information to a target neural network model corresponding to the target virtual character model to obtain target animation data of the target virtual character model, wherein the target neural network model is a model obtained by performing machine learning training with skeletal animation training data corresponding to the target virtual character model, the target animation data comprises a multi-frame target character animation, and position information of the complete skeleton of the character skeleton framework of the target virtual character model in a current posture is recorded in each frame of character animation of the multi-frame target character animation; and driving the target virtual character model according to the target animation data to perform a corresponding action, wherein inputting the target motion description information to the target neural network model corresponding to the target virtual character model to obtain the target animation data of the target virtual character model comprises:

generating animation training data for the target virtual character model by means of motion capture;

training the target neural network model corresponding to the target virtual character model;

collecting basic animation data of a basic virtual character model by means of motion capture;

acquiring a motion description information generation algorithm;

acquiring a skeleton joint position from the collected basic animation data, and obtaining basic motion description information by means of calculation of the skeleton joint position;

obtaining target motion description information by performing posture matching on the basic motion description information according to body proportion information; and inputting the target motion description information to the target neural network model corresponding to the target virtual character model to obtain the target animation data of the target virtual character model.

9. The non-transitory storage medium according to claim 8, wherein the key node skeleton is an end skeleton in the complete skeleton.

10. The non-transitory storage medium according to claim 8, wherein the computer program is further configured to:

acquire basic motion description information of a basic virtual character model, wherein the basic virtual character model and the target virtual character model are the same type of character models;

determine a correspondence between the basic virtual character model and the target virtual character model; and adjust the basic motion description information according to the correspondence to acquire the target motion description information of the target virtual character model.

11. The non-transitory storage medium according to claim 10, wherein the same type of character models indicates that the basic virtual character model and the target virtual character model belong to a same biological classification.

12. The non-transitory storage medium according to claim 10, wherein the computer program is further configured to:

determine a proportional relationship between the basic virtual character model and the target virtual character model according to a basic model size of the basic virtual character model and a target model size of the target virtual character model.

13. The non-transitory storage medium according to claim 12, wherein the processor is further configured to:

adjust skeleton end position information in the basic motion description information according to the proportional relationship to acquire skeleton end position information in the target motion description information.

14. An electronic device, comprising a memory and a processor, wherein a computer program is stored in the memory, and the processor is configured to run the computer program to perform the following operations:

acquiring target motion description information of a target virtual character model, wherein the target motion description information is configured to record position information of a key node skeleton of a character skeleton framework of the target virtual character model in each frame of character animation, the character skeleton framework comprises a complete skeleton of the target virtual character model, and the key node skeleton is a partial skeleton in the complete skeleton of the character skeleton framework;

inputting the target motion description information to a target neural network model corresponding to the target virtual character model to obtain target animation data of the target virtual character model, wherein the target neural network model is a model obtained by performing machine learning training with skeletal animation training data corresponding to the target virtual character model, the target animation data comprises a multi-frame target character animation, and position information of the complete skeleton of the character skeleton framework of the target virtual character model in a current posture is recorded in each frame of character animation of the multi-frame target character animation; and driving the target virtual character model according to the target animation data to perform a corresponding action, wherein inputting the target motion description information to the target neural network model corresponding to the target virtual character model to obtain the target animation data of the target virtual character model comprises:

generating animation training data for the target virtual character model by means of motion capture;

training the target neural network model corresponding to the target virtual character model;

collecting basic animation data of a basic virtual character model by means of motion capture;

acquiring a motion description information generation algorithm;

acquiring a skeleton joint position from the collected basic animation data, and obtaining basic motion description information by means of calculation of the skeleton joint position;

obtaining target motion description information by performing posture matching on the basic motion description information according to body proportion information; and inputting the target motion description information to the target neural network model corresponding to the target virtual character model to obtain the target animation data of the target virtual character model.

15. The electronic device according to claim 14, wherein the key node skeleton is an end skeleton in the complete skeleton.

16. The electronic device according to claim 14, wherein the processor is further configured to:

acquire basic motion description information of a basic virtual character model, wherein the basic virtual character model and the target virtual character model are the same type of character models;

determine a correspondence between the basic virtual character model and the target virtual character model; and adjust the basic motion description information according to the correspondence to acquire the target motion description information of the target virtual character model.

17. The electronic device according to claim 16, wherein the same type of character models indicates that the basic virtual character model and the target virtual character model belong to a same biological classification.

18. The electronic device according to claim 16, wherein the processor is further configured to:

determine a proportional relationship between the basic virtual character model and the target virtual character model according to a basic model size of the basic virtual character model and a target model size of the target virtual character model.

19. The electronic device according to claim 18, wherein the processor is further configured to:

adjust skeleton end position information in the basic motion description information according to the proportional relationship to acquire skeleton end position information in the target motion description information.

20. The electronic device according to claim 16, wherein the processor is further configured to:

acquire original animation data; and determine the basic motion description information of the basic virtual character model from the original animation data according to a motion description information calculation manner corresponding to the basic virtual character model.

* * * * *